Sept. 11, 1962      T. R. MUTTO      3,053,549
BAR FOR LOCKING LOAD IN VEHICLE
Filed Sept. 12, 1960      2 Sheets-Sheet 1
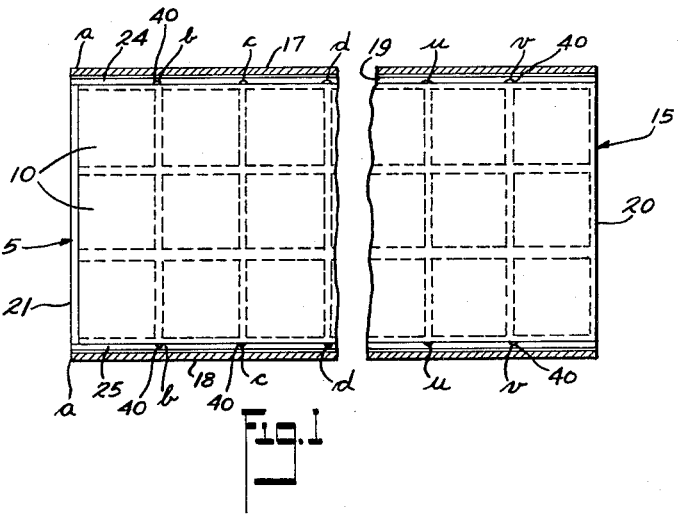
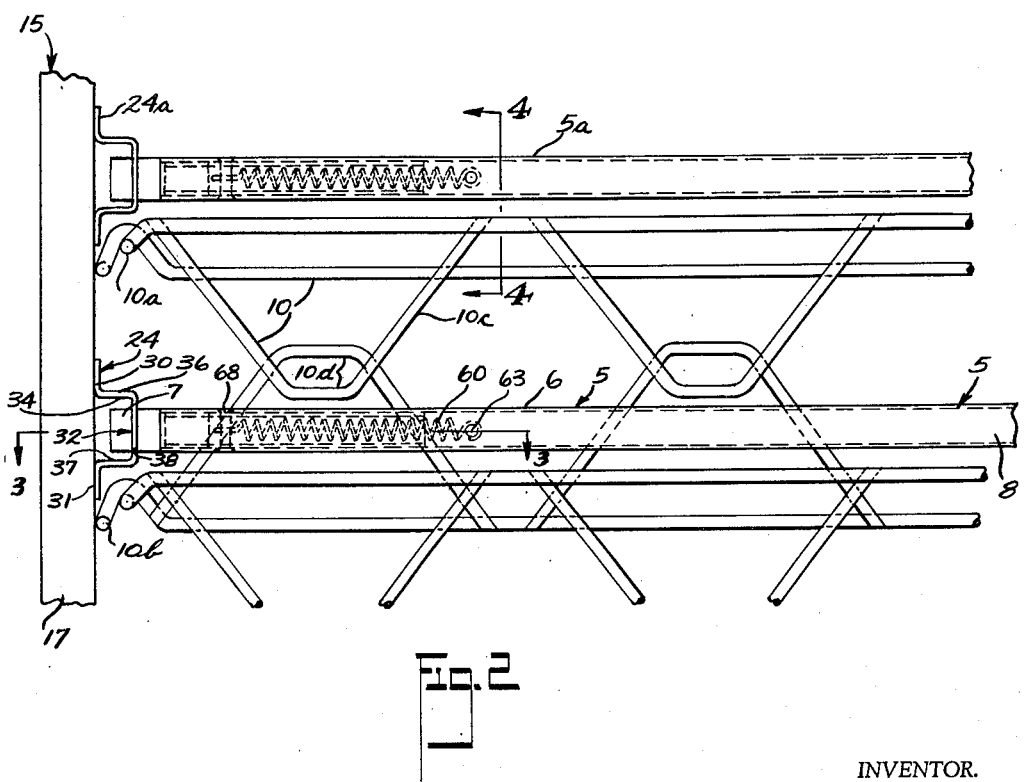
INVENTOR.
THEODORE R. MUTTO
BY
*Meyer, Baldwin, Doran & Young*
ATTORNEYS

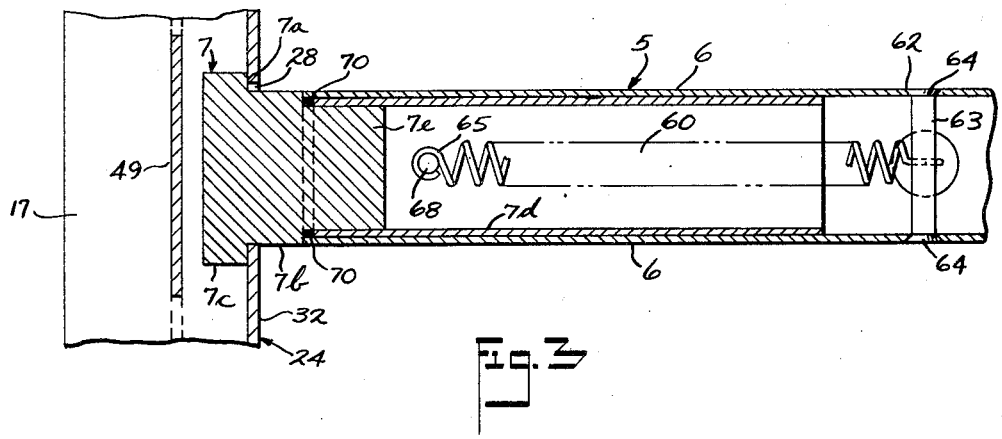
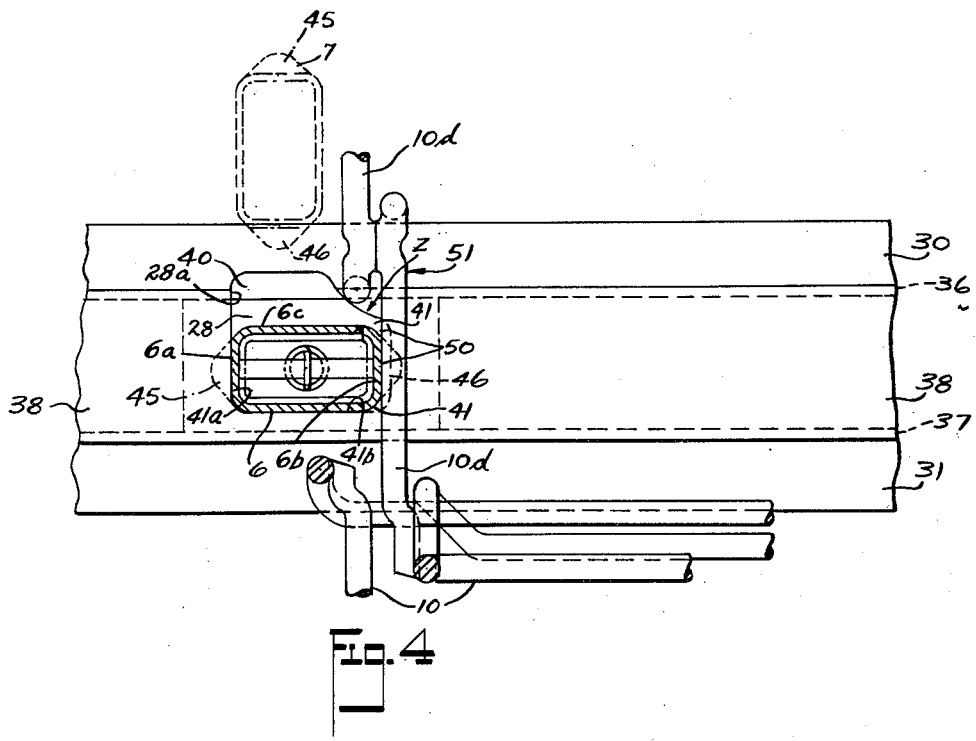

tent Office 3,053,549
Patented Sept. 11, 1962

3,053,549
BAR FOR LOCKING LOAD IN VEHICLE
Theodore R. Mutto, Shaker Heights, Ohio, assignor to Nestaway Incorporated, Cleveland, Ohio, a corporation of Ohio
Filed Sept. 12, 1960, Ser. No. 55,551
3 Claims. (Cl. 280—179)

The present invention relates to locking means and, more particularly, to a locking bar used to secure a load such as individual lots of merchandise including a plurality of racks for carrying bread and the like in a vehicle.

In the present invention, locking means is provided to lock a load, such as a stack of racks, in a vehicle having a bottom and upstanding, parallel opposite side walls, each wall equipped with a locking member comprising preferably a pair of channels, each channel having a series of bar-receiving openings horizontally aligned with like openings in the other channel. The locking means includes a locking bar having end locking head members thereon which are adapted for insertion into the channel openings for locking engagement therewith to thereby secure the bar in a position substantially parallel to each of the locking members. Spring means is also provided to urge each locking head member inwardly toward the bar to permit divergence between the locking members and still retain the locking engagement of each locking head member in its corresponding channel opening.

It is an object of the present invention to provide locking means to secure a load such as a plurality of stacked racks within a vehicle having opposite side walls in which the locking means comprises a bar having end members adapted to enter and lock within openings located in channel members attached to the side walls.

It is also an object of the present invention to provide locking means for securing loads in a vehicle such as a truck or trailer having opposite side walls, the locking means comprising an elongated bar having end members adapted for locking engagement with openings in channels attached to the side walls so that the bar is held in a position generally normal to the vehicle side walls, the locking means also including spring means for permitting outward movement of each of the end members of the locking bar when the channels are spread apart by outward bowing of the vehicle side walls and yet still retaining the locking engagement of the bar and its end members in its associated channel.

It is an object of the present invention to provide a locking bar adapted for securing a load in a vehicle having upstanding generally parallel side walls and having a pair of locking members mounted thereon in parallel horizontally aligned relationship, there being a pair of horizontally aligned bar-receiving openings in said channel, one opening in each channel, there being end members at the free ends of the locking bar for locking engagement within the channel openings, and there being also spring means urging each end member toward its corresponding bar end to thereby permit divergence between the channels while still retaining locking engagement of each bar member in its corresponding channel opening.

These and other objects will be apparent from the specification that follows, the appended claims, and the drawings in which:

FIG. 1 is a diagrammatical horizontal sectional view of a portion of a vehicle having opposite side walls with channels attached thereto and embodying the locking means of the present invention;

FIG. 2 is an elevational view taken from the rear of the vehicle of FIG. 1 and looking inside the same with parts broken away and shown in section;

FIG. 3 is a sectional view taken along the line 3—3 indicated in FIG. 2; and

FIG. 4 is a sectional view taken along the line 4—4 indicated in FIG. 2.

The present invention provides a locking bar 5 having a main portion 6 that is preferably hollow and having end locking head members 7 and 8 at each end thereof adapted for locking a load in a vehicle.

As shown in the drawings, the locking means 5 is well suited for locking stacks of racks 10 such as those used to carry bread, doughnuts, and the like in a vehicle 15 which may be a truck or trailer. As seen in the drawings, the vehicle 15 has a pair of opposite generally parallel side walls 17 and 18, a floor 19, a front wall 20 and a rear opening 21.

A pair of horizontally aligned parallel locking members comprising channels 24 and 25 are attached to the vehicle side walls, channel 24 on side wall 17 and channel 25 on side wall 18. Each of the channels has a plurality of bar-receiving openings 28, each opening generally horizontally aligned with a corresponding opening in the other channel. Each of the channels is formed preferably from a one-piece sheet of metal and bent to provide substantially parallel flange end portions 30 and 31 adapted for mounting on one of the vehicle side walls by suitable means, such as welding, and a bulging central web portion 32 disposed therebetween and projecting into the interior of the vehicle to provide a hollow interior chamber 34 between the vehicle side wall 17 and central portion 32 as best seen in FIG. 2. The web portion 32 provides an upper generally horizontal side wall 36 and a horizontal parallel lower side wall 37 with an intermediate wall 38 disposed therebetween.

In accordance with the present invention, each of the end members 7 and 8 is adapted for locking engagement with its corresponding channel opening 28 in which the bar 5 is held in a position generally perpendicular to each of the channels 24 and 25.

As best seen in FIG. 4 the portion of the opening 28 that is located in intermediate web wall 32 is generally L-shaped or boot-shaped with a vertical leg 40 and a generally horizontal leg 41. The toe end of leg 41, which is the end opposite leg 40 as seen in FIG. 4, preferably points toward the front of the vehicle. Also, a portion 28a of the opening 28 of about the same width as the vertical leg 40 is located in the upper side wall 36. The opening, if desired, might be extended to include a portion of the upper flange 36 of the channel 24.

As also best seen in FIG. 4 and as illustrated therein by member 7, each end member 7 is provided with a pair of ears 45 and 46 rigid therewith. The ears, which are preferably segments of a circle or ellipse in cross sectional outline, provide end member 7 with a longer dimension in one direction than the other, the parts being so arranged and constructed that the end portion of member 7 with its longer dimension will pass downwardly in said opening and can then be turned 90 degrees to cause member 7 to lie with its longer dimension horizontal and with one end edge 6a of the bar portion 6 lying snugly against vertical edge 41a of the leg 41 of opening 28. As seen in FIG. 4, the prelock position of end member 7 with its ears 45 and 46 generally vertically aligned is shown in dot-dash lines. The main bar portion 6 also is provided with a vertical edge surface 6b which, in the above position, lies snugly against a vertical edge 50 of a load 51 which may include a stack of racks 10. As seen in the drawings, the bar 5 fits conveniently between upper and lower tiering platform members 10a and 10b of the rack 10 along a side edge 10c, thereof, the edges 10c comprising upper and lower generally U-shaped side support members 10d, and the lower support 10d providing the vertical edge 50 just described.

Although the stack of racks 10 illustrated herein are relatively non-tipping and not easily toppled over, an upper bar 5a, substantially exactly like bar 5, may be disposed and locked in place on channel members similar and parallel to channels 24 and 25. One end of the bar 5a in FIG. 2 is shown locked in place in upper channel 24a which is parallel to and spaced above channel 24 on wall 17 in the same manner that bar 5 is located in channel 24. Thus more than one locking bar can be used as a safety feature when the load might be toppled over more easily than the stack of racks 10.

Referring to FIG. 1, in order to illustrate some of the outstanding advantages of the present invention, it can be seen that the vehicle 15 may be provided with locking members 24 and 25 having bar-receiving openings therein at predetermined longitudinal distances from the front wall 20 as a point of reference. Where the load will consist of uniform racks, as illustrated here, the openings 28 are placed at distances which are multiples of the rack dimension from front to rear of the vehicle. Openings 28, thus, may be provided at stations designated as a, b, c, etc. up to as high as desired in a given vehicle, as illustrated at u or v in FIG. 1. The locking bar 5, then, can be quickly inserted in any one of the stations a to v, inclusive, to secure the load therein; and, as is apparent from the drawings, if there is only one row of stacked racks 10 to be transported, the one line of stacked racks may be secured by placing the locking heads 7 and 8 of bar 5 in openings 28 of channels 24 and 25, respectively, at station v. If twenty rows of stacked racks are desired to be secured in the vehicle, the bar 5 can be placed in its locking engagement at station c. If twenty-two rows are loaded into the vehicle, the locking bar can be locked in place quickly at station a.

To bear against the merchandise in the desired location vertically, the locking means of the present invention is adapted for locking the edge 51 of load 50 at a predetermined height above the vehicle bottom 19 as well as at a predetermined distance from the front wall 20. Thus, each of the channels 24 and 25 are secured to side walls 17 and 18 respectively at a predetermined height above the floor.

Thus, at station a, bar openings 28 are provided in each of the channels 24 and 25 at the predetermined distance from the floor 19 and at the predetermined distance from the front wall 20. Also, both the horizontal leg 41 and its vertical edge 41a (heel portion) of opening 28 are located at predetermined positions and the length of leg 41 is made to be slightly longer than the longest cross sectional dimension of the main bar portion 6 to allow its insertion thereinto. Thus, the locking bar in cross section is of slightly less length than the distance the horizontal leg 41 of opening 28 and its longest cross sectional dimension (side 6c) is equal to the previously calculated distance between a line perpendicular to the channel at vertical edge 41a and the vertical edge 50 of load 51.

The locking bar 5 is of a length slightly less than the distance between the vehicle side walls 17 and 18 and slightly greater than the distances between the intermediate walls 38 of the bulging channel web portion 32 of each of the channels. Also, if desired, a wear plate 49 can be provided on each side wall of the vehicle (as illustrated in FIG. 3) opposite the L-shaped opening in the outer channel 28.

As best seen in FIGS. 3 and 4, each locking head 7 is preferably non-rotatably mounted on one end of the bar 5 and adapted for sliding engagement therewith by telescoping within the interior of the main portion 6 of bar 5. The locking head 7 comprises outer enlarged ear portion 7c and a stem portion 7d which is adapted to slide within the hollow main portion 6 of bar 5. Spring means comprising a tension spring 60 is provided inwardly of each of the locking heads and disposed within the main bar portion 6. One end 62 of each spring 60 is connected to the main bar portion 6 by a vertical pin 63 having rivet heads 64 which secure the pin and connect the spring to the walls of the main bar portion 6. Another end 65 of each of the pins is connected to the stem portion 7d of the locking head by suitable fastening means such as horizontal rivet pin 68.

In describing further details of the locking head 7 and its telescoping action with bar 5, FIG. 3 illustrates the preferred embodiment of the locking head 7 for its slidable connection with its corresponding bar end. As therein seen, the main bar 6 and stem portion 7d are rectangular in section, the latter telescoping within the former.

The locking head 7, thus, is provided with an outer portion 7c, which includes the ear portions 45 and 46.

As seen in FIG. 3, a lower handle portion 7e is provided for outer portion 7c of head 7, the portion 7e being rigidly connected to stem 7d by weld 70 and the whole locking head assembly can be moved laterally with respect to the main bar portion 6. Thus, it can be seen that the spring 60 urges each locking head assembly, including the ear portions 45 and 46 of head locking portion 7c (as seen in FIGS. 3 and 4), towards its corresponding end of the bar 5 to thereby permit divergence between channels 24 and 25 while retaining the locking engagement of each locking head within its corresponding channel. Also FIGS. 3 and 4 show the locking engagement of outer portion 7c of the locking head within the interior 34 of the control web 32.

As seen in FIG. 3, there is provided an intermediate portion 7b between the portions 7c and 7d, the portion 7b being of a size intermediate therebetween.

It is preferred that the head stem portion 7b be of the same shape as the end of the main bar portion 6 and that the width thereof be only slightly less than the width of the vertical leg 40 of opening 28 so that when the locking head 7 is inserted over opening 28 with its longer dimension vertical, the outer head portion 7c will pass through the portion 28a of opening 28 and the intermediate head stem 7b will move vertically down along the vertical leg 40; the width of head stem portion 7b is also preferably short enough that very little rubbing is encountered between the leading edge 6b of the bar and the lower surface edge 41b of horizontal leg opening 41 and between the trailing edge 6a and vertical edge 41a of leg 41 when inserting the locking head 7 in opening 28 and the bar is pivoted 90° to lock the ear portions 45 and 46 within the central web 32 and also jam the bar between vertical edge 50 of load 51 and vertical edge 41a. However, if the length of vertical leg 40 is not enough, there will not be sufficient room to pivot the bar in the boot or L-shape opening made by legs 40 and 41.

Thus, it is preferred that the thickness of the bar 6 (length of edges 6a and 6b) be about ½ to ¾ of the width (length of side edge 6c) and the clearance at the instep of the boot be about ⅔ to ⅘ of the width, the clearance at the instep being measured from a point z on the instep to the bottom edge 41 on a line perpendicular thereto.

It is to be understood that, in accordance with the provisions of the patent statutes, the particular form of product shown and described and the particular procedure set forth are presented for purposes of explanation and illustration and that various modifications of said product and procedure can be made without departing from my invention.

What is claimed is:

1. A locking bar adapted for securing individual lots of merchandise such as a plurality of racks for carrying bread and the like in a vehicle having opposite side walls and having a pair of channels mounted on the interior face of said side walls in substantially parallel horizontally aligned relationship, there being a pair of horizontally aligned bar-receiving openings in said channels, one opening in each channel; there being end members at the free ends of said locking bar adapted for locking engagement with said channel openings, at least one of said end members being mounted for telescopic movement relative to said bar, and spring means urging at least said one end member toward its corresponding bar end, thereby permitting divergence between said channels while retaining locking engagement of each bar end in its corresponding opening.

2. Means for locking in a vehicle having a bottom and upstanding generally parallel side walls, a load having a vertical edge at a predetermined height above said bottom and at a predetermined longitudinal distance from a point of reference on said vehicle, comprising horizontally alined locking members, one secured to each of said side walls at said predetermined height and at said predetermined distance from said point of reference, each of said members providing a generally vertical wall spaced from the associated vehicle wall, there being a generally L-shape opening through said vertical wall with vertical and horizontal legs, the horizontal leg thereof being of a predetermined horizontal length and terminating at at least one end thereof in a vertical edge, the vertical leg thereof being open at the top, a locking bar of slightly less length than the distance between said vehicle side walls, a locking head on at least one end of said bar and mounted non-rotatably and telescopically thereon, said head being generally rectangular in section the longer dimension fitting loosely in said predetermined horizontal length opening with one end of said rectangular sections flat against said one vertical edge, the width of said rectangular section being slightly less than the width of said vertical leg and slightly less than the width of said horizontal leg of said opening laterally of the vertical leg, the parts being so constructed and arranged that said locking head with its longer dimension vertical will pass downwardly in said opening and can then be turned 90° to cause said head to lie with its longer dimension horizontal and with one end snug against said one vertical edge of said opening, in which latter position said bar is provided with a vertical surface lying snugly against said load vertical edge at the side of said bar horizontally opposite said one vertical edge of said opening, whereby said bar is limited to direct vertical movement only because of said vertical edge and said vertical surface, and such direct vertical movement is limited by the width of said horizontal leg of said opening laterally of the vertical leg, ears rigid with said locking head at the narrower ends of said rectangular section and adapted to engage, outside of said L-shape opening, the side of said locking member vertical wall toward said vehicle wall when said locking head has its longer dimension horizontal, and spring means urging said locking head toward said bar.

3. In a housing such as a vehicle having opposite generally parallel side walls, an end wall and a floor, the combination of horizontally aligned locking members, one secured to each of said side walls at approximately the same height from the floor, each of said members providing a generally vertical wall spaced from the associated vehicle wall, there being a generally L-shape opening through said vertical wall with vertical and horizontal legs, the horizontal leg thereof being of a predetermined horizontal length and terminating at at least one end thereof in a vertical edge, the vertical leg thereof being open at the top, a locking bar of slightly less length than the distance between said vehicle side walls, a locking head on at least one end of said bar and mounted non-rotatably and telescopically thereon, said head being generally rectangular in section the longer dimension fitting loosely in said predetermined horizontal length opening with one end of said rectangular sections flat against said on vertical edge, the width of said rectangular section being slightly less than the width of said vertical leg and slightly less than the width of said horizontal leg of said opening laterally of the vertical leg, the parts being so constructed and arranged that said locking head with its longer dimension vertical will pass downwardly in said opening and can then be turned 90 degrees to cause said head to lie with its longer dimension horizontal and with one end snug against said one vertical edge of said opening, in which latter position direct vertical movement of said bar is limited by the width of said horizontal leg of said opening laterally of the vertical leg, ears rigid with said locking head at the narrower ends of said rectangular section and adapted to engage, outside of said L-shape opening, the side of said locking member vertical wall toward said vehicle wall when said locking head has its longer dimension horizontal, and spring means urging said locking head toward said bar.

References Cited in the file of this patent
UNITED STATES PATENTS

| | | |
|---|---|---|
| 1,432,437 | Bergens | Oct. 17, 1922 |
| 1,764,037 | Brunner | June 17, 1930 |
| 2,056,704 | Anderson | Oct. 6, 1936 |
| 2,608,420 | Eck | Aug. 26, 1952 |
| 2,930,331 | Stough | Mar. 29, 1960 |